United States Patent [19]

Aiena et al.

[11] 4,439,837
[45] Mar. 27, 1984

[54] NON-VOLATILE MEMORY SYSTEM FOR INTELLIGENT TERMINALS

[75] Inventors: Peter P. Aiena, Kettering; Eduard Schulz, Centerville, both of Ohio

[73] Assignee: NCR Corporation, Dayton, Ohio

[21] Appl. No.: 274,125

[22] Filed: Jun. 16, 1981

[51] Int. Cl.³ .............................................. G06F 15/06
[52] U.S. Cl. ..................................................... 364/900
[58] Field of Search ... 364/200 MS File, 900 MS File, 364/405, 408

[56] References Cited

U.S. PATENT DOCUMENTS

| | | | |
|---|---|---|---|
| 3,581,291 | 5/1971 | Iwamoto et al. | 364/200 |
| 3,588,839 | 6/1971 | Belady et al. | 364/200 |
| 3,967,247 | 6/1976 | Andersen et al. | 364/200 |
| 4,064,490 | 12/1977 | Nagel | 364/200 |
| 4,070,706 | 1/1978 | Scheuneman | 364/200 |
| 4,107,784 | 11/1978 | Van Bemmelen | 364/900 |
| 4,126,898 | 11/1978 | Spangler et al. | 364/900 |
| 4,156,905 | 5/1979 | Fassbender | 364/200 |
| 4,161,788 | 7/1979 | Rosenblum | 364/900 |
| 4,197,579 | 4/1980 | Otis et al. | 364/200 |
| 4,200,913 | 4/1980 | Kuhar et al. | 364/900 |
| 4,215,400 | 7/1980 | Denko | 364/200 |
| 4,220,991 | 9/1980 | Hamano et al. | 364/405 |
| 4,223,381 | 9/1980 | Rozell et al. | 364/200 |

Primary Examiner—Jerry Smith
Assistant Examiner—Mark P. Watson
Attorney, Agent, or Firm—J. T. Cavender; Albert L. Sessler, Jr.; Elmer Wargo

[57] ABSTRACT

An intelligent terminal comprising a first memory system (bubble memory) for storing data including a plurality of function programs; a second memory system (static RAM) and a processor operatively coupled to the static RAM to execute instructions therefrom at high speeds. A keyboard is used for selecting a function program to be executed and a direct memory access controller is used for transferring data, including a function program which is selected by the keyboard, from the bubble memory to the static RAM to enable the processor to execute the selected function program. A comparator is used for determining the end of a selected function program, and a static scratch pad RAM is used to store changes made in data to be returned to the bubble memory.

10 Claims, 7 Drawing Figures

NON-VOLATILE MEMORY SYSTEM FOR INTELLIGENT TERMINALS

BACKGROUND OF THE INVENTION

This invention relates to a method and apparatus for operating a non-volatile memory system for use in an intelligent terminal.

There are certain problems which exist with terminals of the type which are used for financial or banking purposes, hotel/motel reservations, retailing, and the like. Continuous efforts are being made to reduce the costs of manufacturing, maintaining, and operating these terminals.

One of the problems which exists with these prior art terminals is that they frequently use Programmable Read Only Memories or PROMs to store their associated application programs; this makes the storage costs expensive. Also, changes in the programs cannot be readily made in the field or at a customer's site; this necessitates changes to be made at the factory, thereby resulting in a significant delay to the customer.

Another problem which exists with terminals which use Read Only Memories or ROMs is that while they provide inexpensive storage, their use does not permit changes or updates to be made in the field. When changes are necessary, they are effected by the ROM vendor. This means that long delays may eventuate. If many or frequent changes are required, the cost advantage for using ROMs is lost.

Those terminals which use dynamic RAMs have the advantage of "ease of effecting a change in the field" compared to terminals which use ROMs and/or PROMs in their memory systems. However, the use of dynamic RAMs requires "refresh logic" and a battery back-up system to provide for non-volatility of the application programs stored therein. The non-volatility achieved by this technique exists for only a short time, especially for a memory system which is large enough to store application programs. Also, the use of dynamic RAMs requires a cassette, floppy disc or a hard disc device for permanent storage of the application programs and for daily loading of the programs into the dynamic RAMs.

The prior art terminals previously described may also require a permanent battery back-up for some data such as totals and constants which may need to be changed during normal operation of the terminal.

SUMMARY OF THE INVENTION

This invention comprises a first memory system for storing data including a plurality of function programs; a second memory system; a processor means operatively coupled to said second memory system to execute instructions therefrom; entry means for selecting a function program to be executed; means for transferring data, including a function program which is selected by said entry means, from said first memory system to said second memory system to enable said processor means to execute said selected function program; and means for determining the end of a said selected function program.

The method of operating a terminal according to this invention comprises the steps of:

(a) storing data including a plurality of function programs in a first memory system;

(b) selecting a function program to be executed;

(c) transferring the selected function program from said first memory system to a second memory system;

(d) executing said selected function program from said second memory system; and (e) determining the end of said selected function program to terminate said executing step.

DETAILED DESCRIPTION OF THE INVENTION

Figure 1A:
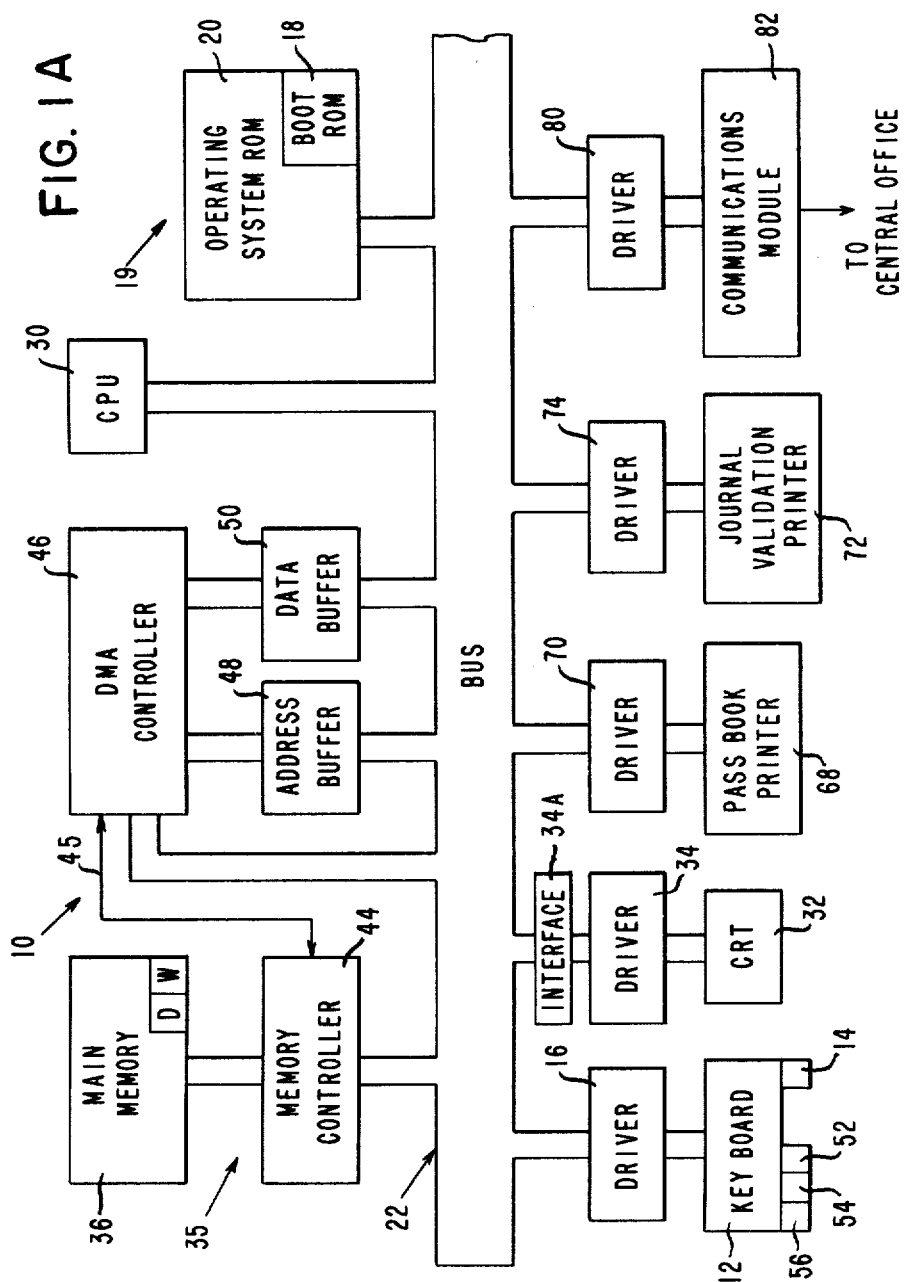
FIGS. 1A and 1B taken together show a schematic diagram, in block form, of a preferred embodiment of this invention which is depicted as an intelligent terminal.
Figure 1B:
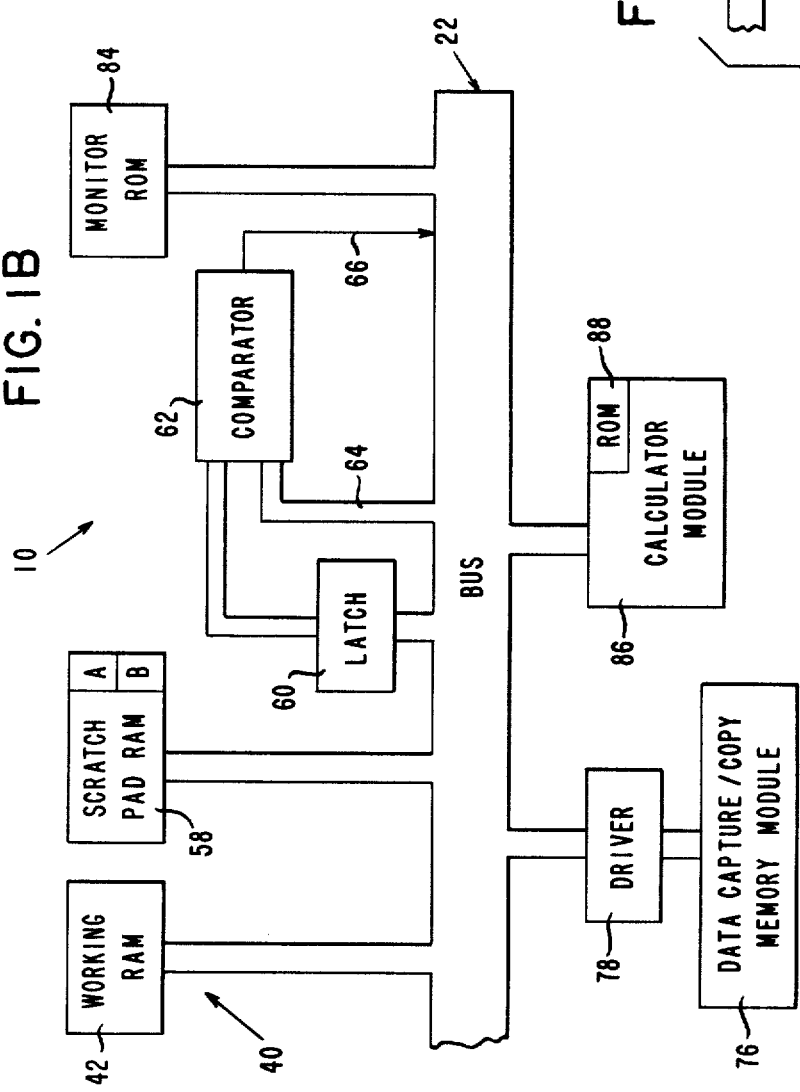

FIGS. 1A and 1B taken together show a schematic diagram, in block form, of a preferred embodiment of this invention which is depicted as an intelligent terminal which is designated generally as 10. As used herein, an intelligent terminal is a terminal or piece of hardware which can run operations or execute a wide variety of transactions without the need for a host computer and the terminal comprises a processor, an entry means, and operating programs.

In a typical application, the terminal 10 may be used in commercial banks, thrift institutions, hotel/motel environments, hospitals and the like. However, in order to illustrate the use of the terminal 10, it will be discussed in relation to financial institutions.

The terminal 10 (FIGS. 1A and 1B) includes means for entering data such as a host computer system (not shown) or a keyboard 12 having a switch 14 thereon to energize the terminal 10. Energizing the terminal 10 initiates the usual start-up functions in association with a "boot" read only memory (ROM) 18 which is part of a ROM memory designated generally as 19 and which also includes an operating system ROM 20. The keyboard 12, the ROM memory 19 and the remaining elements to be described hereinafter are coupled via a bus which is designated generally as 22.

The start-up functions mentioned relate to initializing the various integrated circuit chips and diagnostic routines associated with the various components in the terminal 10.

Figure 2:
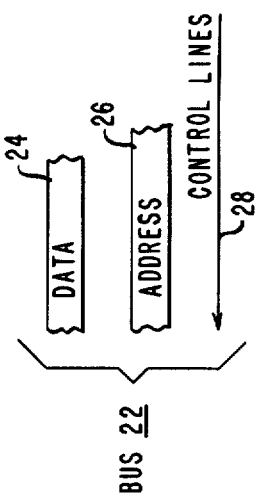
FIG. 2 is a diagrammatic view of the bus shown only generally in FIG. 1.

In order to simplify the drawing, the bus 22, shown in FIGS. 1A and 1B, is shown as one entity; however, the bus 22 is made up of different components as shown in FIG. 2. The bus 22 is comprised of a data bus 24, an address bus 26, and control lines 28. The bus 22 is conventional and may be of the tri-state variety which is a type which facilitates the transfer of data among different elements in a system.

When the terminal 10 is used in a financial or banking environment, some of the initial functions which are performed on the terminal 10 are as follows:

1. The operator or teller enters his number on the keyboard 12.

2. Any constants which are needed for the day's operations, including the date for the operation or transaction, and the beginning transaction number for that particular day are also entered.

3. Depending upon a particular application, the associated inputs such as bank number, location, etc., would be entered via the keyboard 12.

The above named functions may be effected by application programs which are stored in the operating system ROM 20.

Assuming that all the above functions are completed, the terminal 10 is ready to handle transactions; however, before discussing a variety of transactions, it appears appropriate to discuss the various elements included in the terminal 10.

Figure 3:
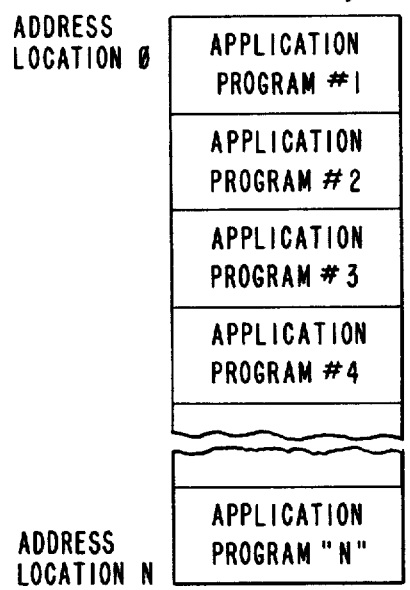
FIG. 3 is a simplified map showing the layout of the main memory shown in FIG. 1A.

The terminal 10 (FIG. 1A) includes a conventional central processing unit (CPU) 30 which is coupled to the bus 22 to handle the processing of data for the terminal. The terminal 10 also includes a cathode ray tube (CRT) 32 which is coupled to the bus 22 via a conventional interface 34A which is controlled by an associated driver 34. The CRT 32 displays data and also provides lead-through instructions in association with the operating system ROM 20 and application programs such as are shown in FIG. 3 and the CPU 30.

The drivers such as 16 and 34 and others to be described hereinafter are essentially programs which reside in the memory ROM 19; however, they are shown as separate entities to facilitate a showing of the functions which they perform. Also, in order to simplify the drawing, the usual conventional interfaces such as 34A which couple the elements such as printers 68 and 72 to the bus 22 are not shown; however, their associated drivers such as 70 and 74, respectively, are shown.

The terminal 10 also includes a first memory system 35 including the main memory 36 (FIG. 1A) and a second memory system 40 including the working random access memory (RAM) 42 shown in FIG. 1B.

In the embodiment described, the first memory system 35 (FIG. 1A) also includes the associated control logic such as the memory controller 44, the Direct Memory Access (DMA) controller 46, address buffer 48, and data buffer 50. The main memory 36, in a preferred embodiment, is of the bubble memory variety. The main memory 36 provides for low-cost, non-volatile storage for storing data such as application programs associated with the terminal 10. While the first memory system 35 provides for low-cost storage, it is not capable of operating at high speeds.

The second memory system 40 including the RAM 42 (FIG. 1B) provides for the high-speed execution of the application programs mentioned. In the embodiment described, the RAM 42 is a static RAM, having a capacity which is smaller than the capacity of the main memory 36. This permits the application programs which are stored in the main memory 36 to be transferred selectively to the working RAM 42 where the programs are executed at the high speeds of the CPU 30.

The application programs mentioned are transferred out of main memory 36 to the working RAM 42 in response to an input from the keyboard 12.

In addition to having the usual alpha numeric keys, the keyboard 12 (FIG. 1A) has a plurality of function keys like 52, 54, and 56, for example, thereon. Each key like 52, 54, and 56 when actuated, initiates the transfer of an associated application program or mini program. For example, FIG. 3 schematically shows one organization of the main memory 36. The various application programs alluded to earlier herein are numbered 1, 2, 3, 4 . . . through "N", and have addresses ranging from 0 through "n". For example, the key 52 (FIG. 1A) may initiate the transfer of the program #2 (FIG. 3) to the working RAM 42, the key 54 may initiate the transfer of the program #3 to the RAM 42, etc.

Following with the example given earlier herein, after the usual housekeeping functions associated with the terminal 10 have been completed, a user or teller may be required to handle the depositing of $100 to a customer's account. If the terminal 10 is being operated in an off-line system, the teller obtains a ledger card for that customer's account. If the terminal 10 is being operated in an on-line system or environment, the teller simply enters the account number on the keyboard 12 and depresses a function key to obtain the customer's monetary balance from the associated central bank or host system (not shown). Assume for the moment, that the terminal is operated in an offline mode, that the teller enters the customer's monetary balance in the keyboard 12, and that the teller actuates the function key 52 which initiates the transfer of an application program, for example, program #2 (FIG. 3) to the working RAM 42. An input to the keyboard 12 will generate an interrupt to the CPU 30 causing the operating control to transfer from the operating system ROM 20 to the keyboard driver 16. The driver 16 has a look-up table (not shown) associated therewith which is used to convert the actuation of a function key into the appropriate address to select the corresponding application program like #2 from the main memory 36. The driver 16 then initializes the Direct Memory Access (DMA) controller 46 with the beginning address of the working RAM 42 into which the application program from main memory 36 will be transferred. Correspondingly, the driver 16 will initialize the memory controller 44 with the beginning address of the main memory 36 from which the application program will be withdrawn. After this initialization, the CPU 30 relinquishes control to the DMA controller 46 which executes the transfer of program #2, in the example being discussed, to the working RAM 42. In this example, the program #2 simply transfers the monetary amount for the account number entered on the keyboard into a scratch pad RAM 58 (FIG. 1B).

Each application program such as #2 has a first line of data which is used to initiate the end of that program. For example, the first line of program #2 contains the address or number of the last step in that program. After program #2 is transferred to the working RAM 42, the CPU 30 will add the value of one to the address or number on the first line of that program and transfer this increased number (called length data) to the latch 60 (FIG. 1B) where it is stored. For example, if the last step in program #2 is 24, the number 25 will be placed in latch 60. As the steps in program #2 are executed by the CPU 30, an associated program counter (not shown) will be incremented. Also, as each subsequent address of program #2 is initiated, this address is fed into a comparator 62 over the bus 22 and the input 64 of the comparator 62. After step 24 is completed, the program counter will be incremented to indicate that step 25 is to be executed next. When the address or step 25 is placed on the bus 22 and input 64 to the comparator 62, the comparator 62 will issue an end of program signal on conductor 66 (due to length data 25 already being present on one of its two inputs), indicating the termination of program #2. At the completion of the program #2, the end of program signal on conductor 66 is used to return control to the operating system ROM 20.

Continuing with the example of making a deposit of $100.00 to a customer's account, after the customer's monetary balance is transferred to the scratch pad RAM 58, the teller enters $100.00 on the keyboard 12 and pushes the appropriate function key for a deposit function, like deposit key 54. The look-up table (not shown) associated with the driver 16 will then select the address for the appropriate application program, like program #3, for example, and this program will be placed in the working RAM 40 as previously described. The scratch pad RAM 58 has "A" and "B" portions associated therewith as shown diagrammatically in FIG. 1B. The A portion of RAM 58 may have the associated buffers, storage registers and the like while the B portion of RAM 58 may be set up initially with constants such as date, bank number, and the like. Continuing with the example of making a deposit, the program #3 would include the steps of "take the customer's monetary balance in register 1 of scratch pad RAM 58 and add to it the $100.00 deposit which appears in register 2 of scratch pad RAM 58 and place the total in register 3 of the RAM 58."

As part of the application program #3 discussed in the previous paragraph, instructions may be given to the teller via the CRT 32 requesting him to, "Insert passbook into printer", for example. In this regard, the teller places the passbook in a passbook printer 68 (having an associated driver 70) which prints the deposit of $100.00 and the new monetary balance along with date, etc. In the embodiment described, the main memory 36 may have a portion "D" which stores a record of the deposits received during the day, and it also may have a Portion "W" which stores a record of the withdrawals made during the day. When working with a "deposit" function, for example, the teller must use an "End" function key after all the deposit functions are completed. For example, some of the deposits may be in the form of checks and some may be in the form of actual cash. Because the teller knows when the "deposit" functions are completed, he then actuates an "End" function key which will cause the various types of deposits stored in the scratch pad RAM 58 to be transferred to the main memory 36. In the example being described, the deposits of both checks and actual cash are transferred to the portion D of the main memory 36 to enable the branch to keep a record of all deposits during the day's transactions. The withdrawals for a day's transactions would correspondingly be tallied in portion W of the main memory 36. In this regard, the scratch pad RAM 58 is used for updating or changing the contents of the main memory 36. Thereafter, control will shift to the operating system contained in ROM 20.

In the examples given in the previous paragraph, there would be an application program (like those shown in FIG. 3) for each of the "deposit" (cash) and "deposit" (checks) functions, and these programs would be effective to temporarily store the affected totals in the scratch pad RAM 58. Because the teller knows when he is finished with "deposits", for example, he then actuates the "End" function key which transfers the data to the main memory 36 as previously described. In the embodiment of the terminal 10 described, the application programs such as those in FIG. 3 are designed to transfer revised data to the main memory 36 by simply actuating the "End" function key. Some of the functions performed by the application programs may be so specific in nature that an "End of function" operation can be included in the application program itself.

If a function key, like key 56 which may be associated with application program #4, were actuated at a time when another function or application program is being executed, then the keyboard driver 16 will merely set up the address for the application program #4 on the DMA controller 46 and the memory controller 44 as previously described. When the end of program signal is derived from the comparator 62 for the application program being currently executed, the controllers 44 and 46 will then execute the transfer of the program #4 (in the example being discussed) from the main memory 36 to the working RAM 42 as previously described. The keyboard driver 16 also has buffering capability to enable the successive actuations of function keys to be buffered for later execution.

The terminal 10 may also have a journal validation printer 72 and associated driver 74 provided for obtaining a printed audit trail as is customarily done.

The terminal 10 (FIG. 1B) is also provided with a data capture/copy memory module 76 and associated driver 78 which is coupled to the bus 22. The memory module 76 actually resides in the main memory 36; however, it is shown separately to illustrate its function more readily. The memory module 76 stores the transaction data to obtain a running account of all the day's transactions. The transaction data, for example, may include the transaction number, transmission number, customer account number, "deposit" or function code, and the monetary amount of the transaction. This transaction data may be routed conventionally to a central bank or office via the driver 80 and the communications module 82 shown in FIG. 1A when the terminal 10 is operating in an on-line mode. The steps for carrying out the transfer of transaction data from the terminal 10 to the central office are initiated by an application program which is transferred from the main memory 36 to the working RAM 42 as previously described. If the communication network including the communications module 82 fails, or if the terminal 10 is operating in an off-line mode, the application program in the working RAM 42 will effect the transfer of the transaction data to the scratch pad RAM 58. Thereafter, the transaction data is transferred from the working RAM 42 to the main memory 36 where it is stored until the communication network is established. A monitor ROM 84 has the necessary program steps therein to effect the transfer of the transaction data from the main memory 36 to the central office when the communications network is again established. The monitor ROM 84 also enables a user of the terminal to write his own application programs which are then stored in the main memory 36; this aspect will be discussed hereinafter.

The terminal 10 also includes, as an optional feature, a calculator module 86 (FIG. 1B) with an associated ROM 88 to enable the teller to perform calculations (using the terminal 10) which could be performed by a separate calculator. The module 86 includes a conventional calculator chip such as chip #AM 9512 which is manufactured by Advanced Micro Devices. The module 86 is especially useful when making calculations such as multiplication or division which consume excessive CPU 30 time and extensive programmer's time in writing the associated programs.

The drivers such as 16, 34, 70, 74, 78 and 80 are essentially programs which are stored in ROM 19 as previously explained and they control the interfacing of the associated elements like the keyboard 12, CRT 32, printer 68, etc. with the bus 22, the CPU 30, and the various other memory devices disclosed herein. The drivers such as 16, 34, etc. could also be Programmable Read Only Memories (PROMs) or they could be provided as dynamic RAMs. The PROMs would enable a user of the terminal 10 to change some of the programs in the field or site of use, whereas when the drivers such as 16, 34, etc. are ROMs, any program changes must be made by having new ROMs made by the manufacturer thereof. When dynamic RAMs are used for the drivers like 16, 34, etc., the data to be stored in the RAMs could be stored in the main memory 36 and transferred to these drivers (dynamic RAMs) as part of the start-up procedure. If there is power failure after these dynamic RAMs are loaded, they would have to be re-loaded from the main memory 36 in the absence of a battery-back-up system.

Figure 4:
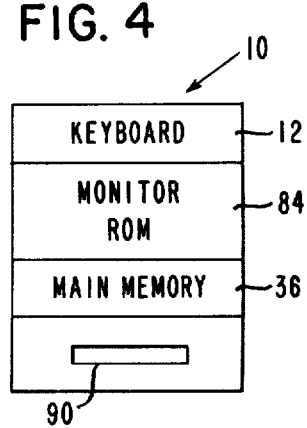
FIG. 4 is a schematic diagram showing certain elements included in the terminal shown in FIGS. 1A and 1B.
Figure 5:
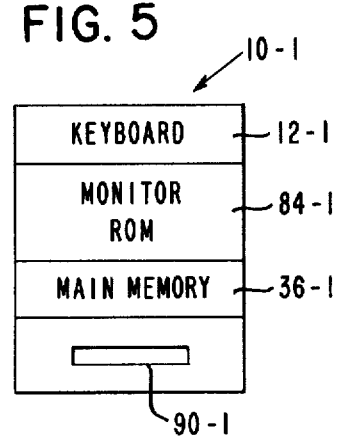
FIG. 5 is a view similar to FIG. 4 to show a duplicate terminal.
Figure 6:
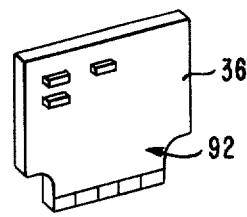
FIG. 6 is a diagrammatic perspective view of a printed circuit board on which memory units are mounted, with the circuit board being inserted in a slot in the terminal in FIG. 5, for example, to transfer the application programs thereto from the terminal shown in FIG. 4.

Earlier herein, it was stated that the monitor ROM 84 (FIG. 1B) enables a user of the terminal to write his own programs which are stored in the main memory 36. In addition, the monitor ROM 84 is used to transfer the data or application programs from the main memory 36 of one terminal 10 to another similar terminal. This feature is shown diagrammatically in FIGS. 4, 5 and 6. Only the keyboard 12, monitor ROM 84 and the main memory 36 of terminal 10 are shown in FIG. 4. In addition, the terminal 10 has a recess 90 into which a printed circuit board (like 92 shown in FIG. 6) may be inserted in order to effect an electrical connection as is customary. The main memory 36 may be contained on the circuit board 92 so as to facilitate the transfer of data therefrom and thereto. The terminal 10-1, shown diagrammatically in FIG. 5, is identical to terminal 10, and for ease of discussion, the reference numerals in FIG. 5 correspond to those used in FIG. 4 except that those used in FIG. 5 are followed by a "dash 1" designation.

To transfer the data or application programs from the terminal 10 (FIG. 4) to an identical terminal 10-1 (FIG. 5), the main memory 36 from the terminal 10 which exists on the printed circuit board 92 (shown in FIG. 6) is inserted in the recess 90-1 in terminal 10-1. Thereafter, a "reproduction" key on the keyboard 12-1 is actuated to activate the monitor ROM 84-1 which effects the transfer of the data and application programs on the main memory 36 to the corresponding main memory 36-1 shown in FIG. 5. Thereafter, the printed circuit board 92 containing the main memory 36 is returned to its appropriate place in terminal 10. This method of transferring data or application programs has several advantages over that employing a magnetic tape which is used to feed data into a terminal. For example, the transferrence of data from terminal 10 to terminal 10-1 is done directly (and almost instantly) from the printed circuit board 92 of terminal 10 to the main memory 36-1 of terminal 10-1 which is also located on a circuit board (not shown). This minimizes the introduction of errors and also reduces the time involved in transferring data. For example, if a magnetic tape is "twenty minutes long", it will take twenty minutes to make the transfer. Also, special loading devices are required when loading the magnetic tape whereas in terminal 10-1, only a slot 90-1, electrically wired to the main memory 36-1, is required.

We claim:

1. A terminal comprising:
   a first memory system for storing data including a plurality of function programs;
   a second memory system;
   a processor means operatively coupled to said second memory system to execute instructions therefrom;
   entry means for selecting a function program to be executed;
   means for transferring data, including a function program which is selected by said entry means, from said first memory system to said second memory system to enable said processor means to execute said selected function program;
   means for determining the end of a said selected function program executed by said processor means; and
   bus means for operatively connecting said first and second memory systems, said processor means, said entry means, said transferring means, and said determining means;
   said second memory system being smaller in storage capacity but faster in operating speed than said first memory system to enable said selected function program to be executed by said processor means at the operating speed of said processor means.

2. The terminal as claimed in claim 1 in which said first memory system is comprised of a non-volatile bubble memory module and said second memory system is a static random access memory.

3. The terminal as claimed in claim 2 further including a third memory system operatively connected to said bus means to store changed data to be returned to said first memory system.

4. The terminal as claimed in claim 3 in which said first memory system further comprises a circuit board on which said bubble memory is located, and in which each said terminal has a coupling means operatively connected to said bus means for receiving a second circuit board having a second bubble memory module thereon; and
   means for transferring data from said second circuit board to said first memory system.

5. The terminal as claimed in claim 4 further comprising a third memory system including an operating system which is operatively coupled to said processor means to provide for control of said terminal when one of said function programs is not being executed by said processor means.

6. The terminal as claimed in claim 2 in which said first memory system and said second memory system are located within said terminal.

7. The terminal as claimed in claim 1 in which said entry means includes a keyboard having a plurality of keys thereon, with at least some of said keys being function keys, with each said function key corresponding to an associated said function program stored in said first memory system;
   said transferring means being effective to transfer a function program from said first memory system to said second memory system in response to the actuation of the associated said function key;

said entry means also including means for buffering at least one successive actuation of a selected one of said function keys to enable the function program associated with said last-named selected one of said function keys to be transferred to said second memory system upon the end of a prior said function program being executed by said processor means.

8. The terminal as claimed in claim 1 in which said first memory system is located on a circuit board which is removable from said terminal to enable said data in said first memory system to be transferred to a second said terminal by inserting said circuit board in said second terminal; said second terminal having a coupling means operatively connected to the second terminal's associated said bus means for receiving said circuit board; said second terminal also having means for transferring said data from said first memory system on said circuit board to a corresponding said first memory system in said second terminal.

9. The terminal as claimed in claim 1 in which said determining means comprises:
 a comparator having first and second inputs thereto with each said function program having length data which is forwarded over said bus means to and latched in said first input of said comparator when said function program is transferred to said second memory system;
 said second input being operatively coupled to said bus means for receiving step data from said function program as the steps of said function program are executed by said processor means, whereby said comparator generates an end of program signal when the last one of said steps of said function program is equal to said length data to signify said end of said selected function program.

10. A method of operating a terminal comprising the steps of:
 (a) storing data including a plurality of function programs in a first memory system located in the terminal;
 (b) selecting a function program to be executed by actuating a key on a keyboard located in the terminal;
 (c) transferring the selected function program from said first memory system to a second memory system located in the terminal;
 (d) executing said selected function program from said second memory system; and
 (e) determining the end of said selected function program to terminate said executing step;
 said storing step being effected by utilizing a bubble memory module and said executing step being effected by utilizing a static random access memory.

* * * * *